Jan. 30, 1968
R. A. DEANE
3,366,942
FLOW STOPPAGE DETECTOR
Filed July 21, 1966
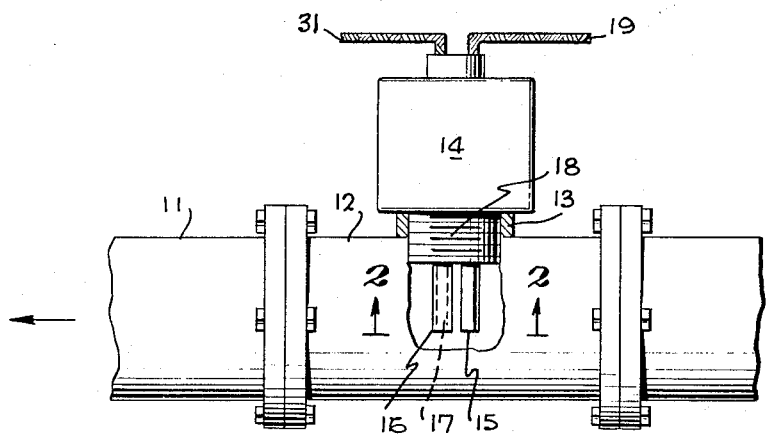
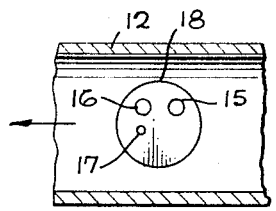
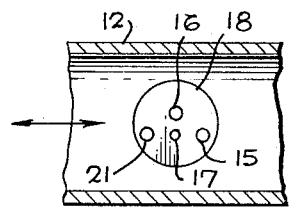
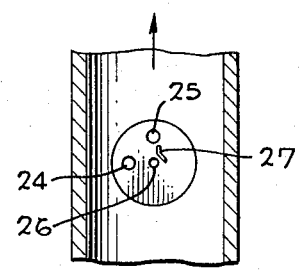
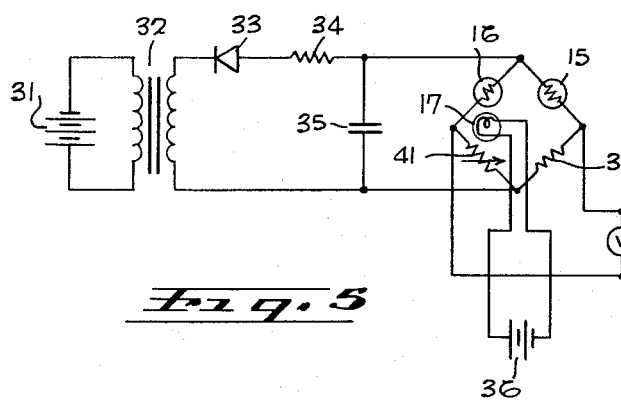
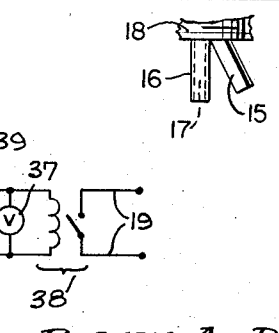
ROBERT A. DEANE
INVENTOR
BY
ATTORNEY

United States Patent Office

3,366,942
Patented Jan. 30, 1968

3,366,942
FLOW STOPPAGE DETECTOR
Robert A. Deane, 22344 Mandell St.,
Canoga Park, Calif. 91304
Continuation-in-part of application Ser. No. 466,007,
June 22, 1965. This application July 21, 1966, Ser.
No. 573,437
6 Claims. (Cl. 340—243)

ABSTRACT OF THE DISCLOSURE

A device for detecting the stoppage of flow in a fluid comprising a heater, a first and second heat sensor and means for detecting differential heat responses between the sensors, said heater and sensors being thermally connected through their bases, immersed in the fluid, positioned to permit the unobstructed flow of the fluid between the heater and the second sensor, and adapted so that when the fluid is flowing the heat generated by the heater and passing into the fluid is dissipated without heating either of the sensors and when the fluid is at rest said heat heats the second sensor through the fluid to a greater degree than the first sensor.

---

This application is a continuation-in-part of my prior copending application Ser. No. 466,007, filed June 22, 1965, now abandoned.

The subject invention relates to flow stoppage detectors, and particularly to detectors of the type employing thermodynamic and fluidic principles for selectively sensing the cessation of flow of materials in fluid, gaseous or solid form.

In many industrial and commercial fields there is a great and heretofore unsatisfied need for a compact and versatile flow detector which positively determines that a particular mass of material has stopped flowing. This need is perhaps most strongly felt in the petroleum and commercial gas industries, which use hundreds of thousands of miles of pipes, tubes, ducts, and other conduits to transport, and countless tanks to store, enormous volumes of material in a variety of forms. These conduits and containers may be vertical, horizontal or inclined, and range in size from fractions of inches to many feet in diameter. The materials vary in composition from gases and highly reactive low-viscosity liquids to semi-solid completely heterogeneous corrosive mixtures of sand, mud, water, and crude oil.

Frequently the conduit or storage vessel contains several different materials having widely differing physical and chemical properties. These materials may be intermixed in a heterogeneous mass or they may form a number of fairly well defined strata.

Often the transport lines and tanks and the pumping equipment associated with them are unattended for long periods. Failure to note a halt in the flow of one or more of the materials in them is almost always costly, and may be catastrophically dangerous. Economic inflation and advances in technology have made, and will continue to make such failures ever more costly and dangerous.

Devices have long been available for detecting, and in some cases measuring the rate of flow of fluids. The most common of these utilize the force exerted by the moving fluid itself against some object immersed in it to indicate or determine the rate of fluid motion. Regardless of the form chosen for the immersed object, for example propeller, vane, piston, deflection arm, drogue, or the like, all of these devices are subject to a number of serious shortcomings. Moveable parts deteriorate after continued immersion for extended periods and become corroded or frozen in place after even brief contact with many fluids. Sealing and packing, always at least minor problems, become monumental tasks where moving parts are involved. Clogging, jamming and fouling frequently occur where the fluid contains any solids, tars or lacquers, or forms them through chemical reaction or chemical decomposition. Mechanical deformation and fatigue induced breakdowns also plague this class of indicators. For all of the foregoing reasons, and in addition because their response rates and sensitivities in fluids of high density and viscosity are generally extremely low, particularly when these fluids are moving slowly, these devices are by and large wholly unsuitable for the detection of flow stoppage.

Another family of flow sensing devices operates on the Venturi principle; but these are wholly unsatisfactory for use with very dense or slow moving fluids. Furthermore, when the fluid is of high viscosity or contains solids there is little chance of keeping their orifices, manometer tubes, bellows, and other pressure sensing or conducting mechanisms free; and they are quickly rendered inoperative. Even when operating properly these devices are unable to indicate positively the termination of fluid flow because all of the above environmental factors influence the delicately balanced signals near and at the zero flow rate.

A completely distinct family of flowmeters described broadly as the "Thomas" type and operating on the electrocaloric principle has been developed in an attempt to overcome many of the deficiencies associated with the mechanical and Venturi types of detectors and flow meters. Basically, the electrocaloric type meter measures flow rate by determining the effect of a given amount of heat dissipated into a stream of fluid flowing in a conduit. Typical examples of this type of flow meter are the "Laub" flow meters illustrated in United States Patents Nos. 2,729,- 976, 2,953,022, and 2,972,885, and the "Howland," "Davis," "Brion," "Morgan," "Hathaway," "Skibitzke," and "Adams" flowmeters illustrated in United States Patents Nos. 3,196,679, 3,030,806, 2,548,939, 2,580,182, 2,647,401, 2,728,225, and 2,859,617, respectively. Although these devices have indeed avoided or eliminated many of the defects mentioned earlier, they suffer from their own inherent deficiencies.

The "Laub" flowmeters require that the fluid be passing or be diverted through a relatively narrow conduit or pipe line, and are not readily adaptable to detect the motion of fluids in large ducts or open containers. The "Laub" installations rely on the ability of a temperature responsive coil surrounding the closed conduit to respond to an increase in the temperature of the conduit wall resulting from the transfer of heat from the fluid to the wall. Heat is added to the fluid by means of a second coil surrounding the conduit upstream of the first heat sensing coil, and is carried to the downstream coil by forced convection. This arrangement measures only the flow of the boundary layer of the fluid in the conduit, and is totally useless with fluids having very dense boundary layers and with non-homogeneous fluids. Also, it will not perform properly where there is substantial turbulence in the fluid path or when the fluid is flowing at a very high or a very low rate, in the former case because of insufficient heating of the fluid, and in the latter because of the excessive dissipation of heat both within the fluid and into the conduit wall. Furthermore, and for many purposes of greatest importance, the "Laub" system does not furnish a positive means of determining that all flow has ceased.

The "Howland," "Davis," "Brion," "Morgan," "Hathaway," "Skibitzke," and "Adams" devices likewise have several very significant drawbacks. Probably the most significant of these is that each of them relies on forced convection, i.e., the motion of the fluid itself, for the transfer of heat from a heating element to a temperature responsive sensor. While the forced convection principle may be of value for use in instruments for measuring moderate rates of flow of fluids through conduits, it is wholly inadequate for detector applications intended to give a reliable indication when all motion in the fluid has ceased.

By their very nature, all of these devices, like the "Laub" invention, are highly susceptible to vagaries in the composition and physical and chemical characteristics of the material and the condition of the material, such as its temperature and stratification. And in addition, the "Laub" flowmeter is strongly affected by ambient air temperature changes as well. It should be noted also that neither the "Laub" nor any of the other named devices will operate properly where the fluid path is inclined more than slightly upwardly or downwardly, as may be the case in those very situations in which flow stoppage detection is vitally needed in the field.

A particularly serious deficiency characteristic of all of the above mentioned devices is their inability to function properly in the presence of heterogeneous mixtures of materials or in situations in which the material or materials appear in several physical states. This deficiency is magnified where the materials are stratified, as where a pipeline contains solidifying tar near its bottom, one or more layers of liquid above the tar and gases above the liquid surface. Unfortunately, it is often of great importance to be able to discriminate between such strata and detect flow stoppage in one of them regardless of the presence or absence of flow in the others.

For these and many other reasons, not only a new instrument but also a new approach to the solution of the problems cited is necessary. The subject invention is such an instrument and embodies such an approach.

The subject invention has many objects, all of them directed toward the provision of a flow stoppage detector which eliminates, or substantially reduces the effect of all of the foregoing deficiencies. These objects include providing:

A simple, yet durably constructed device having no moving parts for positively and reliably detecting the stoppage of movement of a flowing medium;

Such a device capable of performing in any medium, regardless of its physical and chemical form, characteristics and composition, and of continuing to function even while its form, characteristics and composition are changing;

A device of this character which will operate equally well in a closed conduit, a covered vessel, or an open container;

A flow stoppage detector which can be applied to existing lines, vessels and containers without costly refitting, and which can be readily replaced without removing the conduit, vessel or container from operation; and A detector which can be used where the flow of the medium is not horizontal.

Another and particularly significant object is the provision of a flow stoppage detector which is capable at once of utilizing the principles of both convective and conductive heat transfer, and of utilizing one or the other or both in the presence of materials in one or more physical states and in one or more strata.

Other objects and advantages will become apparent as the subject invention and its operation are described by reference to the accompanying drawings, in which:

FIGURE 1 is a top plan view looking downward at a length of fluid transmission line having a portion of its upper wall cut away to show one preferred form of the subject invention in place;

FIGURE 2 is a longitudinal vertical sectional view of part of the line illustrated in FIGURE 1 taken in the direction 2—2;

FIGURE 2a is a fragmentary top plan view of a modification form of the subject invention;

FIGURE 3 is a sectional view similar to that of FIGURE 2 illustrating a modified form of the subject invention;

FIGURE 4 is a sectional view similar to that of FIGURE 3 illustrating another modified form of the subject invention in place in a vertical segment of transmission line; and FIGURE 5 is a simplified circuit diagram illustrating the basic electrical circuit of the subject invention.

Referring now to the drawings, FIGURES 1 and 2 depict a segment of a typical fluid transmission line 11, such as a pipe line used for carrying materials such as crude oil together with its accompanying light gases, saline water, sand, mud, waxes, tars and other impurities, including solids, from a producing oil well to a fieldside storage tank. The direction of flow is from right to left, as shown by the arrow. For convenience, and where practicable to do so, a prefabricated removeable section of pipe 12, adapted by the provision on its side wall of an internally threaded annular boss 13 and an access port in the wall to receive the threaded head 18 of the detector, may be included in the pipeline. This arrangement, while desirable, is not necessary since the existing lines may be adapted quickly and easily to receive the detector by cutting or drilling the port and clamping or welding the preformed boss 13 around it.

The detector itself is preferably contained in a sturdy case having a body or base 14 and head 18. Projecting rigidly outwardly from base 14 and extending through and beyond head 18 are elongated reference probe 15, detector probe 16, and heater 17. As illustrated in FIGURE 2, in one preferred arrangement with the detector in place and firmly attached to the line 11, the longitudinal central axes of the portions of probes 15 and 16 immersed in the materials within the line lie in substantially the same horizontal plane, with reference probe 15 upstream of detector probe 16 and heater 17. The portion of heater 17 within the line is positioned vertically below the detector probe 16, and somewhat closer to detector probe 16 than to reference probe 15. The requirements of the invention permit the probes 15 and 16 and the heater 17 to be positioned so as to have a very low overall profile, thus allowing them to be inserted into the line near its bottom. This capability is of considerable advantage for installations in which very small quantities of material may be flowing along the bottom of the line.

Probes 15 and 16 are preferably conventional thermistors or similar temperature responsive sensors having a high negative temperature coefficient of resistance, hermetically sealed within and in thermal contact with the inner walls of, cylindrical casings. These casings may be made of any suitable material demonstrating high thermal conductivity, such as copper or aluminum.

It is to be understood that although the thermistor offers certain advantages in terms of durability, simplicity of construction and circuitry, and reliability, the subject invention contemplates the use of any convenient type of temperature responsive device, including those such as thermocouples or thermopiles, for probes 15 and 16. If other sensors are employed it may be necessary to make some minor modifications in the electrical circuit shown in FIGURE 5 and discussed later herein; but such modifications will not carry the detector outside the broad scope and fundamental concept of the subject invention.

Heater 17 comprises a conventional alternating or direct current heating element of any convenient form which, like probes 15 and 16 is preferably contained in a thermally conductive cylindrical casing.

Preferably the casings of heater 17 and probes 15 and 16 are permanently secured at their upper ends to the inner wall of section 12 with their bores open upwardly so as to be exposed when base 14 and head 18 are removed from the line. By mounting probes 15 and 16 and heater 17 as a unit for swivelable connection to base 14 and head 18, the entire detector unit may be adapted to be removed from the line and replaced without halting the flow of material and without the loss of any of the line's contents.

In one embodiment of the invention the portions of probes 15 and 16 within head 18 and base 14 are thermally insulated from the base of heater 17 and from each other, in order to insure that any heat sensed by the probes will be that of the particular material in which they are immersed. The identical result is achieved in the embodiment of the invention illustrated in FIGURE 2a by making head 18 of a thermally conductive matter and mounting probe 15, of the same length as probe 16, at a point on head 18 the same distance from the mounting point of heater 17, as probe 16, but angled away from heater 17.

In a preferable embodiment, however, and one which constitutes a significant improvement over all of the prior art devices referred to earlier, means are provided within head 18 or base 14 for the transfer of heat from heater 17 to probes 15 and 16 along differential paths. This may be accomplished by making the base 18 of FIGURE 2 thermally conductive, or by connecting each of the probes to the heater by means of a thermally conductive shunt (not shown). The desired heat path differential may be achieved by attaching sensor probe 16 to the mounting plate or head 18 at a point closer to heater 17 than the point of attachment of reference probe 15, or by attaching both of the probes at substantially the same distance from heater 17 and having reference probe 16 projecting perpendicular to the mounting plate, with reference probe 15, of a greater length than probe 16, mounted to project angularly away from heater 17.

Regardless of the specific means used, the purpose of this preferred arrangement is to insure that in the absence of other influences acting upon the two probes, probe 16 with its shorter heat transfer path from heater 17 will experience greater heating than will probe 15.

The description of the operation of this preferred form of a detector can best be followed when considered along with a description of the electrical circuit of the invention as shown in FIGURE 5.

This circuit may be miniaturized and contained wholly within the detector casing, or its principal elements may be maintained at a site some distance from the detector. Preferably, however, the detector is fully self-contained, requiring no external electrical connections other than that to its source of power 31.

Basically the circuit comprises a power source 31, which may be a conventional source of standard 110 volt alternating current or, with appropriate minor changes in circuit design, direct current; a common line isolation transformer 32; and a typical rectifier 33 of the vacuum tube or gas filled type or, preferably, a semiconductor diode type, which, acting through resistor 34, serves to rectify the high frequency pulses and thereby charge condenser 35 with a fixed polarity. A Wheatstone bridge is formed in the circuit and includes the thermistors of probes 15 and 16 balanced against fixed resistance 39 and variable resistance 41, respectively. A voltmeter 37, galvanometer, ohmmeter, or other suitable current detecting or measuring device may be connected across the bridge to give a visual indication when the bridge becomes unbalanced, or across thermistor 15 to measure directly the temperature of the material in which it is immersed. In addition, if desired a relay switch 38 likewise may be connected across the bridge. Leads 19 from the relay switch 38 may be connected to any desired auxiliary warning device, such as a light or alarm, or to a secondary operational circuit, such as one activating a standby pump or automated valve system or the like. A separate source of current for heater 17 is shown; however, source 31 may be used for this heater with little or no adaptation.

In operation with the detector in place in transmission line 11 and with the material flowing the detector circuit is connected to the power sources 31 and 36 and the Wheatstone bridge balanced by means of variable resistance 41. By selecting the differential heat transfer means within base 18 to have a thermal conductivity lower than that of the flowing material to be monitored, the effect of heat transfer by conduction from heater 17 through base 18 and into probes 15 and 16 can be effectively disregarded, since the heat thus transferred will be dissipated by convection through the flowing material before it reaches the thermistors within the probes. Further balancing of the bridge should not be necessary unless the current flow rate in the line 11, 12 or the material temperature changes radically.

Although heater 17 is continuously emitting heat, neither the initial nor the continuing balance between probe 15 and probe 16 is influenced by the emission since the heat is continuously being carried from both probes by forced convection current created by the flow of fluid. This is true whether the flowing medium be a finely divided solid, a low viscosity liquid, a gas under low pressure, or a virtual solid.

Should the flow stop, where the fluid is of relatively low viscosity, normal convection currents formed above the heater 17 immediately begin to rise vertically. The distance between the sensing portion of reference probe 15 and heater 17 and the relative positions of the two are carefully adjusted to insure that the sensor of probe 15 is untouched by the vertically rising currents. The temperature of reference probe 15 is thus not changed. The detector probe 16, located vertically above the heater 17, lies directly in the path of the rising natural convection currents however, and bathed in the relative heat of these currents, its temperature and thus resistance rise, thereby upsetting the voltage balance of the Wheatstone bridge and giving positive indication that the flow has stopped.

In the event the character of the medium will not support normal convection currents, as in the case of semi-solids or crystallized or solidified media, heat is carried from heater 17 by normal thermal conduction. Since the sensor of detecting probe 16 is positioned closer to heater 17 than the sensor of reference probe 15, a greater quantity of heat carried by such conduction will reach the former, again throwing the Wheatstone bridge out of balance and warning of the flow stoppage.

Experimentation has demonstrated that heat transferred by radiation from heater 17 is so insignificant that its effect on the operation of the detector may be completely disregarded. This is particularly the case in thermal-opaque liquids or solids.

A significant feature of the subject invention, and one which distinguishes it from all of the prior art devices mentioned earlier, resides in the fact that since it relies on normal convection currents and normal conduction to indicate flow stoppage, and since such currents and conduction become effective only when the fluid flow completely ceases, a sharp and clearly discernible line exists between the indications given by this device while there is any motion in the fluid and those given when the motion stops. With all of the prior flowmeters indications of fluid motion are given continuously or intermittently, even while the flow is subsiding, and the cessation of flow can be assumed only when the indications cease. The difficulty of ascertaining with any degree of accuracy the moment at which such indications actually cease is obvious. In the subject invention this problem is completely obviated, because its indication of flow stoppage is not only a sharp one, but in fact an increasing one.

With the fluid flow halted, the longer the natural convection currents or normal conduction are allowed to continue the greater the temperature differential between probes 15 and 16, and the further out of balance the Wheatstone bridge circuit. By providing a second relay or auxiliary warning device, set to be activated only when the bridge imbalance reaches a predetermined level appreciably higher than that at which the first relay or warning device is actuated, this characteristic of the subject invention may be utilized to great advantage.

It will be observed that while probes 15 and 16 are immersed in a flowing liquid medium or a moving solid medium the loss of heat transferred from heater 17 through the bases of probes 15 and 16 within head 18 allows the system to operate precisely as if the probes were thermally insulated from heater 17 at their bases. When the flow of the liquid or solid material ceases, however, the addition of heat to probe 16 through its base as well as through the medium itself, either by convection or conduction, greatly amplifies the imbalance of the Wheatstone bridge and the resultant flow stoppage warning. Similarly, since the heat absorbing capabilities of gases are markedly lower than those of either liquids or all but a fairly small number of solids, it is possible by adjusting the bridge circuit to enable the detector system to selectively ignore the influence of gas flow without changing its sensitivity to the stoppage of the fluid or solid material sought to be monitored. On the other hand, if desired, the system may quite easily be adapted to sense the flow or stoppage of flow of gas without regard to the existence or relative motion of liquid or solid materials simultaneously present.

A somewhat unusual situation exists in certain operations such as the monitoring of gas production wells. Here the flow of the gas itself may be quite sporadic; and the only real concern is the formation of ice, which may block the line with potentially disastrous results. With a slight modification in the position of detector probe 16, the subject invention is ideally suited to detect this dangerous condition.

All that is necessary here is to locate probe 16 out of the path of the ascending convection currents formed when the gas flow ceases, and to adjust the warning system to "ignore" the heating effect resulting from the differential heat transfer from heater 17 through the bases of probes 15 and 16. In this configuration, no stoppage warning will be given during any normal operations, including the complete stoppage of gas flow. Should ice form in the line, however, even the relatively small influence of heat conducted from heater 17 through the ice to sensor 16 will be sufficient to trigger the warning mechanism.

FIGURES 3 and 4 illustrate two of the numerous embodiments the subject invention may take. The form shown in FIGURE 3 is particularly suitable for use in situations where it is anticipated that the fluid may be flowing alternately in opposite directions. For this purpose an additional heat sensing reference probe 21 is provided on the opposite side of heater 17 from probe 15. Conventional selector switch means in the leads from probes 15 and 21 to the Wheatstone bridge circuit permit probe 15 to be used as the reference when fluid flow is from right to left, and probe 21 to be used as the reference when the flow is reversed.

Under some circumstances a considerable advantage may be gained by locating the reference probe 15 or 21 downstream from, and either on the same level as, or slightly higher than, heater 17. In this configuration, if the Wheatstone bridge is balanced while heater 17 is on and the forced convection currents associated with the moving fluid are warming the reference probe the effect of flow stoppage on the balance of the bridge circuit will be greatly magnified. Since the sensitivity and accuracy of the subject invention and the magnitude of its response to flow stoppage are directly related to the temperature differential between reference probe 15 or 21 and detector probe 16, it is obvious that under most conditions it is preferable to position the reference probe within the anticipated convection stream from the heater.

The arrangement of the probes illustrates in FIGURES 2 and 3 will prove satisfactory for use in fluids flowing in horizontal or even in vertically ascending or descending lines or paths. To utilize either of these forms where the fluid path is inclined from the horizontal, it is merely necessary to rotate the base 14 until detector probe 16 lies directly above heater 17.

When the direction of flow is vertically downward, either the embodiment of FIGURE 2 or FIGURE 3 will perform satisfactorily. When the direction of flow is vertically upward a slight modification may be desirable, since detector probe 16 would be subjected to the heating effects of forced convection as well as natural convection. Even under this condition, however, either of these two forms would still be operative, because detector probe 16 will retain far more heat in the absence of fluid flow around it than in the presence of such flow. Accordingly, the imbalance of the Wheatstone bridge will be far greater when the fluid surrounding the probes is stopped than when it is moving.

Experimentation has demonstrated that for many oil field applications many advantages are to be gained by installing the detector of the subject invention in a vertical standing section of the oil transmission line. The chief advantage to this arrangement is the elimination of all but the most transitory stratification effects.

As shown in FIGURE 4, another embodiment of the invention provides for the interposition of an inclined deflector 27 partially obstructing the fluid path between heater 26 and detector probe 25. By properly adjusting the placement and angle and incline of deflector 27 with regard for the characteristic of the fluid in which the device is to be used, the forced convection associated with even the slowest moving fluid can be deflected past detector probe 25, thereby eliminating or substantially reducing the possibility of heating caused by forced, rather than natural convection. Placement of reference probe 24 adjacent to detector probe 25 and in the path of the deflected forced convection current will further insure that the detector will be sharply responsive to fluid stoppage.

For descriptive purposes the subject invention has been illustrated as it might be used to detect the stoppage of flow of materials through enclosed conduits. It should be apparent that each of these forms will function quite as well in materials held in open containers or in natural bodies such as rivers, streams, lakes or seas. It may be desirable to alter the form of the base 14 and head 18 for immersion in such fluid media; but these modifications would in no way alter the underlying theory or practice of the subject invention.

It must be understood that the particular forms illustrated here have been chosen for demonstrative purposes only, and are not intended to limit the scope of the invention. The metes and bounds of the invention itself are set forth in the claims which follow.

What is claimed is:

1. A device for detecting the stoppage of flow in a selected medium stratum comprising:
   first heat sensing means including an independent heat sensing element having a high negative coefficient of electrical resistance, mounted on fixed first heat transmitting supporting means, immersed in said medium stratum, and responsive to changes in the temperature thereof;
   second heat sensing means including an independent heat sensing element having a high negative coefficient of electrical resistance, spaced apart from said first heat sensing means, mounted on fixed second heat transmitting supporting means, immersed in said medium stratum, and responsive to changes in the temperature thereof;
   means for heating said medium, mounted on fixed third heat transmitting supporting means, said heating means being
       immersed in said medium spaced apart from said heat sensing means and at a greater distance from said first heat sensing means than from said second heat sensing means, positioned to permit the unobstructed flow of said medium between said heating means and said second heat sensing means, and positioned to have no greater heating effect through said medium on either of said heat sensing means as long as said medium stratum is in a state of flow, and to have a greater heating effect through said medium on said second heat sensing means than on said first heat sensing means when the flow of said medium stratum effectively ceases;

heat transmitting means in constant thermal communication between said third supporting means and said first supporting means and providing with said first and third and said second and third supporting means a first and second heat path, respectively; and means for detecting the differential in the temperature responses of said first and second heat sensing means resulting from the effective stoppage of said flow.

2. A device for detecting the stoppage of flow in a selected medium stratum as defined in claim 1 in which said heating means is positioned under said second heat sensing means.

3. A device for detecting the stoppage of flow in a selected medium stratum as defined in claim 1, in which said first and second heat paths are of equal length.

4. A device for detecting the stoppage of flow in a selected medium stratum as defined in claim 1, in which said second heat path is appreciably shorter than said first heat path.

5. A device for detecting the stoppage of flow in a selected medium stratum as defined in claim 1, adapted to be inserted through an opening in the wall of a conduit or container holding said medium, in which said heat sensing elements and said heating means are adapted to be inserted removeably into elongated hollow thermally conductive casings which are closed at one of their ends and fixedly attached to the inside of said wall with their closed ends projecting into said medium stratum and their open ends exposed through said opening in said wall, said sensing elements and heating means being in thermal contact with the walls of said casings adjacent their closed ends; and the distance between the closed end of the casing containing said first heat sensing means and the closed end of the casing containing said heating means being appreciably greater than the distance between the closed end of the casing containing said second sensing means and the closed end of the casing containing said heating means.

6. A device for detecting the stoppage of flow in a selected medium stratum as defined in claim 5, in which the casings containing said first and second heat sensing means are attached to the inside of said wall equidistant from the point of attachment of the casing containing said heating means, and are of equal length.

References Cited

UNITED STATES PATENTS

| | | | |
|---|---|---|---|
| 2,736,784 | 2/1956 | Gore | 73—362 X |
| 2,799,758 | 7/1957 | Hutchins | 73—362 X |
| 2,938,385 | 7/1960 | Mack et al. | 73—362 |
| 2,961,625 | 11/1960 | Sion | 73—362 X |
| 3,030,806 | 4/1962 | Davis | 73—204 |
| 3,147,618 | 9/1964 | Benson | 73—204 |
| 3,196,679 | 8/1965 | Howland | 73—204 |

FOREIGN PATENTS

| | | |
|---|---|---|
| 1,238,716 | 7/1960 | France. |

OTHER REFERENCES

Thermistors, Their Characteristics and Uses, Pearson, in Bell Laboratories Record, 19 (4); pp. 106–111, December 1940.

Thermistors in Electric Circuits; R. R. Batcher, in Electronic Industries, 4 (1): pp. 76–80, January 1945.

Thermal Resistor Elements For Electrical Circuit Applications, in Product Engineering, R. S. Goodyear, 16 (2), pp. 93–95, February 1945.

RICHARD C. QUEISSER, *Primary Examiner.*

JAMES J. GILL, *Examiner.*

J. C. GOLDSTEIN, E. D. GILHOOLY,
*Assistant Examiners.*